Oct. 22, 1968     M. E. GROTZ     3,406,450
POTATO PEELER WITH EYE REMOVAL CUTTING EDGE
Filed June 1, 1966     2 Sheets-Sheet 1
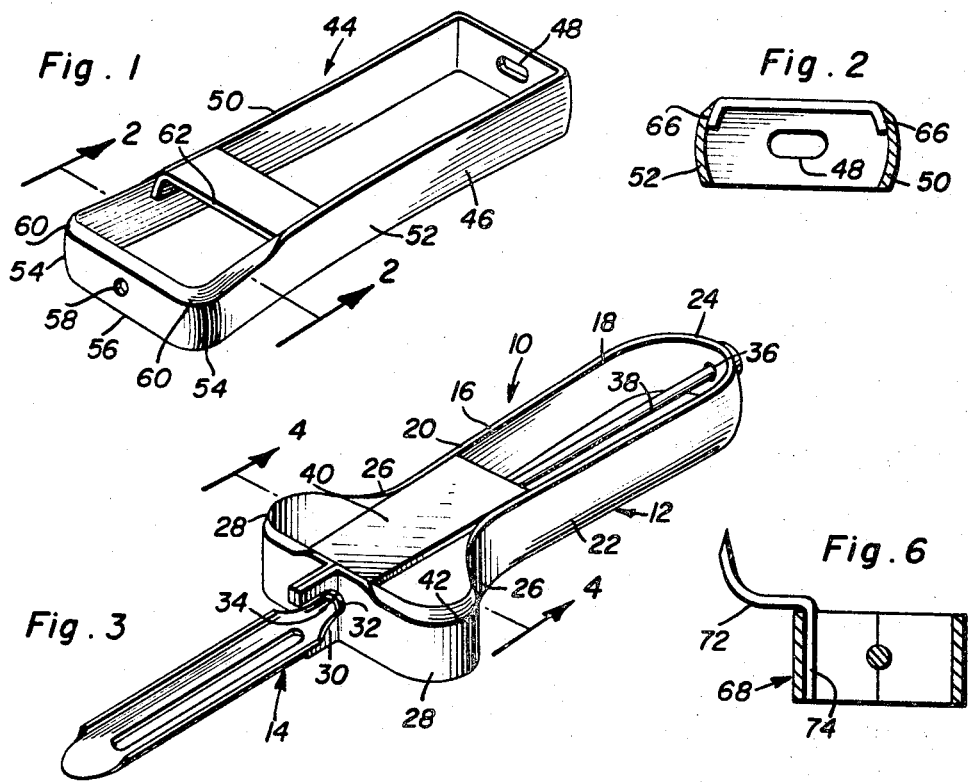
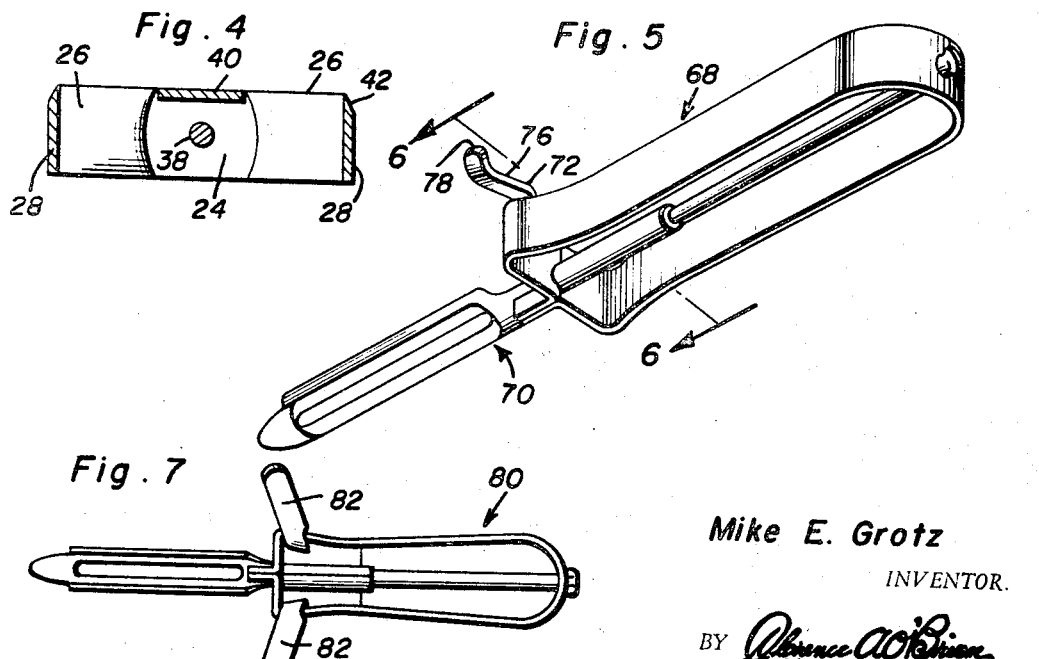
Mike E. Grotz
INVENTOR.
BY *Lawrence A. O'Brien*
and *Harvey B. Jacobson*
Attorneys Oct. 22, 1968 M. E. GROTZ 3,406,450
POTATO PEELER WITH EYE REMOVAL CUTTING EDGE
Filed June 1, 1966 2 Sheets-Sheet 2
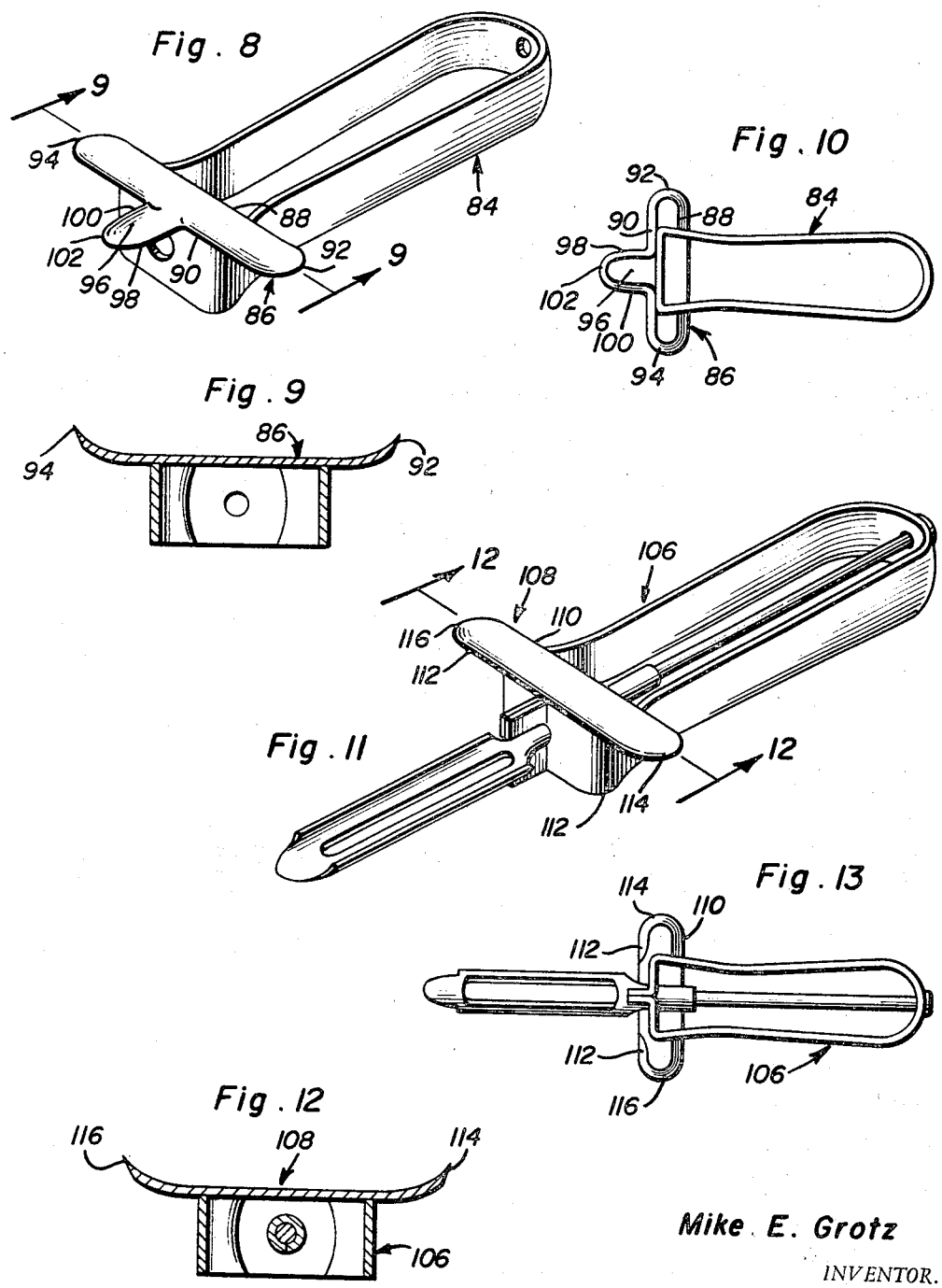
Mike E. Grotz
INVENTOR.

United States Patent Office 3,406,450
Patented Oct. 22, 1968

3,406,450
POTATO PEELER WITH EYE REMOVAL
CUTTING EDGE
Mike E. Grotz, 48 Swan, Sheridan, Wyo. 82801
Filed June 1, 1966, Ser. No. 554,382
2 Claims. (Cl. 30—279)

ABSTRACT OF THE DISCLOSURE

An elongated peeling blade member projecting longitudinally outwardly of one end portion of a handle and supported from the latter for oscillation about its longitudinal axis and including generally parallel, laterally spaced and opposing edges extending longitudinally of the blade member, the elongated handle portion including an arcuate potato eye removing blade portion at said one end portion thereof spaced laterally to one side of the longitudinal axis of the blade member and including arcuate cutting edge portions adapted to cut the area of a potato disposed about an eye.

This invention relates to a novel and useful potato peeler and more specifically to a more or less conventional form of potato peeler including an oscillatable peeling blade. The potato peeler of the instant invention includes, however, an additional eye removal cutting edge, independent of the oscillatable peeling blade, and the eye removal cutting edge is positioned relative to the handle so as to be readily engaged and guided by the thumb of the user of the potato peeler during the process of removing an eye from a potato.

A main object of this invention is to provide a potato peeler of conventional design as far as the usual potato peeling blade portion thereof is concerned but including a potato eye removing cutting edge so positioned relative to the handle of the conventional potato peeler that it may be readily engaged by the thumb of the user of the potato peeler and guided during movement of the eye removal cutting edge to remove the eye of a potato.

Another object of this invention, in accordance with the immediately preceding object, is to provide a potato peeler with an eye removal cutting edge so positioned on the handle of the potato peeler that the eye removal cutting edge may be utilized to remove an eye of a potato without the user of the potato peeler shifting his grip on the handle portion of the potato peeler.

Yet another object of this invention, in accordance with the preceding objects, is to provide a potato peeler with an eye removal cutting edge that is so positioned relative to the handle portion of the potato peeler that it forms a thumb rest for the user of the potato peeler during normal operation thereof to peel a potato independently of removing eyes from a potato.

A final object of this invention to be specifically enumerated herein is to provide a potato peeler with an eye removal cutting edge in accordance with the preceding objects and which will conform to conventional forms of manufacture, be of simple construction, and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a first form of handle portion of a potato peeler constructed in accordance with the present invention and adapted to oscillatably support therefrom a conventional form of potato peeler blade;

FIGURE 2 is a transverse vertical sectional view taken substantially upon a plane indicated by the section line 2—2 of FIGURE 1;

FIGURE 3 is a perspective view of a second form of handle constructed in accordance with the present invention and having a conventional form of potato peeler blade oscillatably supported therefrom;

FIGURE 4 is a transverse vertical sectional view taken substantially upon the plane indicated by section line 4—4 of FIGURE 3;

FIGURE 5 is a perspective view of a third form of potato peeler handle constructed in accordance with the present invention and having a conventional potato peeler blade oscillatably supported therefrom;

FIGURE 6 is an enlarged transverse sectional view taken substantially upon a plane indicated by section line 6—6 of FIGURE 5;

FIGURE 7 is a top plan view of a potato peeler handle constructed in accordance with the present invention and having an oscillatable potato peeler blade supported therefrom, the handle of FIGURE 7 being a slight modification of the handle illustrated in FIGURE 5;

FIGURE 8 is a perspective view of a fourth form of potato peeler handle constructed in accordance with the present invention;

FIGURE 9 is an enlarged transverse vertical sectional view taken substantially upon a plane indicated by section line 9—9 of FIGURE 8;

FIGURE 10 is a bottom plan view of the handle illustrated in FIGURES 8 and 9;

FIGURE 11 is a perspective view of a fifth form of potato peeler constructed in accordance with the present invention and having an oscillatable potato peeler blade supported therefrom;

FIGURE 12 is an enlarged transverse vertical sectional view taken substantially upon a plane indicated by section line 12—12 of FIGURE 11; and FIGURE 13 is a bottom plan view of the assemblage illustrated in FIGURES 11 and 12.

Referring now more specifically to FIGURE 3 of the drawings there may be seen a potato peeler generally referred to by the reference numeral 10 including a handle assembly generally referred to by the reference numeral 12 and a potato peeler blade assembly generally referred to by the reference numeral 14. The handle assembly is defined by an open frame formed from a strap 16 defining a U-shaped portion 18 including generally parallel legs 20 and 22 interconnected at one pair of corresponding ends by means of an integral curved bight portion 24. The ends of the legs 20 and 22 remote from the bight portion 24 are curved outwardly as at 26 and then are reversely curved inwardly as at 28 and terminate in forwardly directed bifurcated flange portions 30 secured together in any convenient manner. The portions of the strap 16 immediately adjacent the flange portions 30 define a pair of semi-circular openings 32 which together form a bore 34. In addition, the bight portion 24 has a bore 36 formed therein aligned with the bore 34.

The blade assembly 14 has an enlarged shank 38 secured through the bores 34 and 36 and loosely received therein whereby the blade assembly 14 is mounted between the portions 30 for limited oscillation relative to the handle assembly 12. The handle assembly 12 also includes a panel like bridging member 40 which extends longitudinally thereof between the legs 20 and 22 and has one end portion secured to the portions of the strap 16 adjacent the portions 30 and the other end portion secured between the free ends of the legs 20 and 22 adjacent the outwardly curved portions 26.

The inwardly curved portions 28 have sharpened upper edges 42 and define potato eye removel cutting edges. The edges 42 are disposed at the front end of the handle assembly 20 and on opposite sides thereof immediately adjacent the blade assembly 14. The user of the potato peeler normally grasps the handle portion 12 in the palm of his hand with the handle 12 substantially completely enclosed in his hand and his forefinger curving down under the front end of the handle assembly 12, beneath the out-turned portion 26 of the leg 20 and extending transversely of the handle assembly 12 to a point beneath the inwardly curved portion 28 of the leg 22. The thumb of the user rests upon the upper surface portions of the inwardly curving portion 28 of the leg 22. Although the edge 42 is reasonably sharp, it is not so sharp that the user of the potato peeler 10 cannot rest the inner surface of the free end of the thumb thereon. Further, the used's thumb may also be rested upon the member 40 in lieu of the inwardly curving portion 28 of the leg 22.

The above description of the manner in which the potato cutter 10 may be gripped by the hand of a user of course is directed to a right handed user and it is believed evident that a left handed user grips the handle assembly 12 in a similar manner but with the inner surface of the free end of his thumb resting upon the cutting edges 42 the inwardly curving portion 28 of the leg 20.

In use, the blade assembly 14 may be utilized in a conventional manner to peel the potato and whenever and eye is encountered during the process of peeling the potato, the thumb engaged with the corresponding sharpened edge 42 may also be partially engaged with the area of the potato in which the eye is formed and utilized to guide the cutting edge 42 during pivotal movement of the handle assembly 12 about an axis extending generally through the center of curvature of the inwardly curving portion 28 while the edge 42 is in contact with the potato adjacent the eye. In this manner, the eye of the potato may be removed by cutting the portion of the potato in which the eye is defined from the potato. Further inasmuch as one of the cutting edges 42 is positioned so as to be disposed immediately adjacent the thumb of the user of the handle assembly 12 when the potato peeler 10 is being utilized to peel a potato by means of the blade assembly 14, the shift from the potato peeling action to eye removing action by the user of the potato peeler 10 is almost immediately with no time lost or inconvenience felt by the user.

With attention now invited more specifically to FIGURE 1 of the drawings, there may be seen a handle assembly generally referred to by the reference numeral 44 and which is similar to the handle assembly 12 in that it includes the U-shaped rear end portion 46 apertured as at 48 and including a pair of forwardly directed legs 50 and 52 curving inwardly as at 54 secured together in the area 56 in which a second aperture 58 is formed aligned with the aperture 48, the upper edge portion of the inwardly curving portions 54 being sharpened as at 60.

A brace member or bridging member 62 extends transversely of the handle assembly 44 and has its opposite ends secured to the inner surfaces of the legs 50 and 52 as at 66 in any convenient manner. Of course, the inwardly curving portions 54 and their cutting edges 60 are positioned in approximately the same location relative to the remainder of the handle assembly 44 as the cutting edges 42 are positioned relative to the remainder of the handle assembly 12. Accordingly, the manner of operation of the handle assembly 44 is substantially the same as the operation of the handle assembly 12.

With attention now invited more specifically to FIGURES 5 and 6 of the drawings there will be seen still another handle assembly generally referred to by the reference numeral 68 and which is basically the same as the handle assembly 12 except that it does not include opposite side portions that project quite so prominently outwardly to the handle assembly 68. A blade assembly 70 corresponding to the blade assembly 14 is provided and in lieu of the cutting edges 42 of the handle assembly 68 has an eye removal blade 72 secured to at least one side of the handle assembly 68. The eye removal blade 72 includes an elongated base portion 74 which is secured in the inner surface thereof and the blade 72 includes a longitudinal edge portion 76 which is sharpened and faces the remote end of the handle assembly 68. In addition, the outer end of the eye removal blade 72 is rounded and the free terminal edge portion of the outer end of the blade 72 is sharpened as at 78 and comprises a continuation of the sharpened edge 76.

With attention now invited more specifically to FIGURE 7 of the drawings there will be seen a further handle assembly generally referred to by the reference numeral 80 and which is substantially identical to the handle assembly 68 except that it includes a pair of eye removal blades 82 corresponding to the eye removal blade 72 and which project from opposite sides of the handle assembly 80.

In FIGURES 8–10 of the drawings there may be seen still another form of handle assembly generally referred to by the reference numeral 84. The handle assembly 84 is substantially identical to the handle assembly 68 except that in lieu of the eye removal blade 72 of the handle assembly 68, the handle assembly 84 includes an eye removal blade generally referred to by reference numeral 86. The blade 86 is elongated, extends transversely of the handle assembly 84 and includes opposite end portions projecting outwardly of the corresponding sides of the handle assembly 84. The blade includes opposite longitudinal edge portions 88 and 90 which are sharpened and rounded sharpened end edges 92 and 94. Further, the blade 86 includes a forwardly extending laterally projection 96 which projects outwardly of sharpened edge 90 centrally intermediate its opposite ends and includes opposite side longitudinal edge portions 98 and 100 as well as a free curved end edge portion 102, the edge portions 98, 100 and 102 being sharpened and the ends of the edges 98 and 100 remote from the edge 102 smoothly curving into the adjacent portions of the edge 90. The projection 96 may be utilized as a thumb rest corresponding to the brace member 40 but disposed in a more forward position. In addition, although the handle assembly 84 is adapted to support the blade assembly such as the blade assembly 70, it may be utilized without the blade assembly and as a separate instrument to remove eyes from potatoes. Of course, it is to be noted that each of the handle assemblies hereinbefore and after specifically described may be utilized with or without blade assemblies corresponding to the blade assemblies 14 and 70.

With attention now invited to FIGURES 11–13, there may be seen a handle assembly generally referred to by the reference numeral 106 and which comprises a substantial duplicate of the handle assembly 84 except that the eye removal blade 108 thereof and corresponding to the blade 86 does not include a forward projection corresponding to the projection 96. However, the eye removal blade 86 includes sharpened longitudinal edge portions 110 and 112 corresponding to the edge portions 88 and 90 and opposite end sharpened edge portions 114 and 116 corresponding to the sharpened edge portions 92 and 94.

From FIGURES 9 and 12 of the drawings it may be seen that the opposite ends of the eye removal blades 86 and 108 curve upwardly at their opposite ends whereby the end portions of the blades 86 and 108 may be utilized as a thumb rest and to at least partially cradle an associated thumb. Further, the outwardly projecting end portion of the blade 72 is also arcuate in configuration as can be best seen from FIGURE 6 of the drawings and is adapted to at least partially cradle a thumb resting thereupon.

In operation, it is believed obvious that any of the handle assemblies herein illustrated and described may be utilized in conjunction with a blade assembly such as the blade assembly 14 for the purpose of supporting the blade assembly 14 while the latter is being utilized to peel a potato. Then, when it becomes necessary to remove an eye of a potato being peeled, the various sharpened edges of the handle assemblies may be utilized for the purpose of cutting around and under the eye to be removed so as to remove the portion of the potato defining the eye.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A potato peeler with eye removal cutting edge, said peeler including an elongated handle portion, an elongtaed peeling blade member generally paralleling said handle portion and oscillatably supported from and projecting outwardly of one end portion of said handle portion for oscillation relative to said handle portion about the longitudinal axis of said blade member, said blade member including generally parallel, laterally spaced and opposing edges extending longitudinally of said blade member, said handle portion being of a transverse girth adapted to be encircled by the palm and fingers of the hand of a user of the peeler with the free end portion of the forefinger of the user extending transversely of said one end portion of said handle portion and the inner surface of the forefinger opposing the adjacent surfaces of the handle and the thumb of the user disposed to one side of said handle portion and overlying the terminal end portion of said forefinger with its inner surface opposing said terminal end portion in spaced relation thereto, said one end portion of said handle portion including an elongated arcuate potato eye removing blade portion extending transversely of said one end portion, disposed to one side of said axis and having a concave upper surface adapted to have the outer side surface of said thumb rest /thereagainst for guiding support therefrom, the longitudinal edge portion of said blade portion facing the other end portion of said handle portion being sharpened and said blade portion being adapted to be rotated about the area of a potato having an eye therein for cutting said potato around and beneath said eye in order to remove the same, the outer end of said blade portion being rounded and sharpened and comprising a continuation of the first mentioned sharpened edge portion, said blade portion being of a length to project laterally outwardly of both sides of said one end of said handle portion and the end of said blade portion remote from said rounded and sharpened end being also rounded and sharpened, said blade portion including a portion, centrally intermediate its opposite ends, projecting laterally outwardly therefrom forwardly of said one end portion of said handle portion, the opposite side edges as well as the free end edge of said portion projecting laterally of said blade portion also being sharpened.

2. A potato peeler with eye removal cutting edge, said peeler including an elongated handle portion, an elongated peeling blade member generally paralleling said handle portion and oscillatably supported from and projecting outwardly of one end portion of said handle portion for oscillation relative to said handle portion about the longitudinal axis of said blade member, said blade member including generally parallel, transversely spaced and opposing cutting edges extending longitudinally of said blade member, said handle portion being of a transverse girth adapted to be encircled by the palm and the fingers of the hand of a user of the peeler with the free end portion of the forefinger of the user extending transversely of said one end portion of said handle portion and the inner surface of the forefinger opposing the adjacent surfaces of the handle and the thumb of the user disposed to one side of said handle portion and overlying the terminal end portion of said forefinger with its inner surface opposing said terminal end portion in spaced relation thereto, said one end portion of said handle portion including an arcuate potato eye removing blade portion projecting transversely outwardly to one side of said one end portion of said handle portion, having a rounded outer end edge and adapted to have the inner surface of said thumb rest thereagainst for guiding said potato eye removing blade portion with said thumb, the longitudinal edge portion of said blade portion adjacent the other end portion of said handle portion and the rounded outer end edge of said blade portion being sharpened, said potato eye removing blade portion being adapted to be rotated about the area of a potato having an eye therein for cutting said potato around and beneath said eye in order to remove the same and being of a length to project laterally outwardly of both sides of said one end of said handle portion and the end of said blade portion remote from said rounded and sharpened end also being rounded and sharpened.

References Cited

UNITED STATES PATENTS

| | | | |
|---|---|---|---|
| 1,374,167 | 4/1921 | Warren | 30—279 |
| 1,698,111 | 1/1929 | Terrell | 30—353 |
| 1,960,651 | 5/1934 | Swazey | 30—279 |
| 2,232,940 | 2/1941 | Fender | 30—278 |
| 2,659,144 | 11/1953 | Conkle | 30—353 |
| D. 166,394 | 4/1952 | Herold. | |

JAMES L. JONES, Jr., *Primary Examiner.*